United States Patent Office 3,203,795
Patented Aug. 31, 1965

3,203,795
PHOTOCONDUCTIVE LAYERS FOR
ELECTROPHOTOGRAPHY
Gustav Schaum and Hildegard Haydn, Leverkusen, Germany, assignors to Agfa Aktiengesellschaft, Leverkusen, Germany, a corporation of Germany
No Drawing. Filed Feb. 25, 1959, Ser. No. 795,350
Claims priority, application Germany, Mar. 5, 1958,
A 28,988
4 Claims. (Cl. 96—1)

The present invention relates to photoconductive layers for electrophotography and more especially to optically sensitised photoconductive layers.

It is known to use certain inorganic or organic substances which can conduct light in the production of photoconductive layers for electrophotographic processes. Examples of such compounds are sulphur, selenium, oxides, sulphides and selenides of zinc, cadmium, mercury, antimony, bismuth, lead and also anthracene and anthraquinone. These substances are applied to an electrophotographic plate, consisting more especially of a metal or other layer-forming material, for example paper or a film-forming plastic. If necessary, the photoconductive substance can be held dispersed in an electrically isolating, layer-forming binder. Such layers being produced by means of coating solutions in which the binders are either dissolved or dispersed and in which the electroconductive substances are dispersed. Such photoconductive layers are for instance disclosed in U.S. patent specifications 2,297,691, 2,357,809, 2,727,807, 2,727,808, 2,735,784, 2,735,785, and in French patent specifications 1,113,933 1,122,275, 1,125,235, and 1,136,146.

One of the photoconductive substances in most general use is zinc oxide. By comparison with many other substances, it has the advantage of providing a white image background. One disadvantage, however, resides in its spectral sensitivity, which is only in the range from 3750–3900 A. Zinc oxide consequently requires to be exposed to ultra-violet light if it is desired to obtain the best possible results.

It is already known that the spectral sensitivity of photoconductors, mainly zinc oxide, can be extended until in the visible range by adding certain dyes. These are dyes from various groups which must be able to absorb the radiation energy and transmit it to the photoconductor. Such dyes which cause an additional spectral sensitivity with zinc oxide as photoconductor are for instance: fluorescein, eosin, erythrosin, Rose Bengal, malachite green, crystal violet, basic fuchsin, methyl green, brillian green, cryptocyanine, pinacyanol, methylene blue, acridine orange, methylene grey, alizarin red S and quinizarin.

It has now been found that the dyes of the phenol sulphonphthalein group are particularly suitable for sensitising photoconductive substances, and primarily zinc oxide, because such dyes bleach out substantially more easily in light as compared with the known dyes. Even the radiation of diffused light causes a change in the color density, whilst intensive visible light leads to a pure white image in a very short time. Moreover, the spectral sensitivity produced with these dyes extends further into the visible range, in fact up to the commencement of the red zone, than those produced with the known dyes.

The phenol sulphonphthaleins of the present invention may be represented by the following general formula:

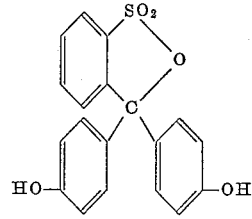

wherein the benzene radicals may be substituted by alkyl groups having 1 to 12 carbon atoms, alkoxy groups, halogen atoms (bromine, chlorine, iodine).

The following are mentioned as examples of substituted phenol sulphonphthaleins:

bromophenol blue=3',5',3'',5''-tetrabromophenol-sulphonphthalein
chlorophenol red=3',3''-dichlorophenol sulphonphthalein
bromocresol purple=5',5''-dibromo-o-cresol sulphonphthalein
bromocresol green=3',5',3'',5''-tetrabromo-m-cresol sulphonphthalein The formulae of, and literature references to, these dyes are indicated in the following table.

1. Bromophenol blue:

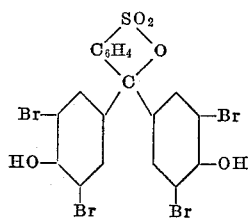

[Beilstein 19, I. Erg. vol. 649; II. Erg. vol. 105. Journ. Am. Chem. Soc., 41, 1205 (1919). Journ. Am. Chem. Soc., 50, 2017 (1928)]

2. Chlorophenol red:

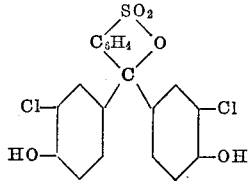

[Beilstein 19, II. Erg. vol. 104. Publ. Health Rep., 41, 3061 (1929)]

3. Bromocresol purple:

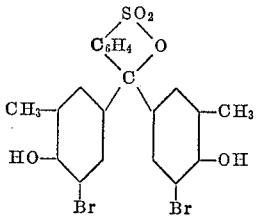

[Beilstein 19, 91; Erg. vol. 110. Journ. Am. Chem. Soc., 20, 266 (1898)]

4. Bromocresol green:

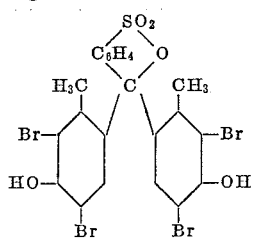

[Beilstein, II. Erg. vol. 108. Journ. Am. Chem. Soc., 48, 2218 (1926). Publ. Health Rep., 41, 3058 (1926)]

They are known as indicator dyes. Their range of color-change at room temperature is below pH 7 and their absorption spectra in the visible range. Due to their acid character, they form a relatively firm bonding with zinc oxide, which has proved very advantageous from the point of view of energy transfer.

After bleaching out the dye in a photoconductor sensitised with one of the dyes mentioned above, the said photoconductor does not revert to the sensitivity of the unreacted zinc oxide. The sensitivity of these layers is between those of the sensitised and unsensitised zinc oxide.

The dyes can be added in dissolved or undissolved form to the suspension of binder and zinc oxide. They can however be mixed beforehand, for example as an alcoholic solution, with the photoconductor. The dye then forms a compound, for example with zinc oxide, and can no longer be washed out by solvents. The sensitised photoconductor, which is now dyed, is then mixed with a suitable binder and further processed in the usual way. The quantity of the dye employed depends on the desired effect and can vary between 0.001 and 0.5 percent based on the weight of photoconductor.

The coating solution which is used for the production of the photoconductive layers comprises a film-forming binding agent, the electric specific resistance of which must be higher than that of the photoconductive substance and preferably also higher than that of the layer support. The best results are obtained with binding agents the electric specific resistance of which amounts to at least $10^{10}$ ohm per centimetre.

Particularly suitable binding agents are silicone resins such as alkyl-, arylpolysiloxanes especially phenyl and methyl polysiloxanes as they are disclosed in German patent specifications 853,351 and 868,975.

Further suitable binding agents are for instance cellulose, cellulose esters, cellulose ethers, polyvinyl chloride. polyurethanes, polyesters, polyamides, polycarbonates with a base of di-(monohydroxyaryl)-alkanes, especially 4,4'-di(monohydroxyaryl)-alkanes according to British patent specifications 772,627 and 808,485.

As solvents for the coating solutions there are preferably used aliphatic or aromatic hydrocarbons, aliphatic alcohols, esters, ethers, especially cyclic ethers such as dioxane, ketones, chlorinated hydrocarbons or mixtures of these solvents. The solvents or solvent mixtures used must be good solvents for the binding agents but non-solvents or poor solvents for the photoconductive substances.

The quantitative ratios between the photoconductive substances and the binding agents may vary within wide limits. It is preferred to apply the photoconductive substance in amounts of 1 part per 0.3 to 2 parts by weight of binding agent, and in amounts of 5 to 40 g. per square metre of photoconductive layer.

As a support for the photoconductive layer there may be used paper or metal plates, such as zinc, aluminium, brass plates. Furthermore, thin foils of cellulose hydrate, cellulose esters or of polyamide come into question.

The processing of the disclosed materials is carried out in the usual manner. The materials are first made sensitive to light by giving them an electrostatic charge on the coating side in the dark, for instance, by means of a corona discharge. The material is then exposed by any of the conventional photographic procedures. The latent image obtained is developed by applying a pigmented resin powder carrying an electrostatic charge which is opposite to that of the photoconductive layer. The powder image is fixed by melting the resin powder.

The light-conductive layers can also be produced from aqueous dispersions of photoconductive substances and binding agents, for instance by the process disclosed in French patent specification 1,136,146.

If necessary, the cast dispersions or emulsions are subjected to a final condensation or final polymerization by heat treatment at temperatures of about 80 to 150° C. for about 2 to 30 minutes after being dried. Aqueous dispersions of polymeric substances, such as melamine-formaldehyde resins, xylene-formaldehyde resins, polymers based on vinyl chloride, vinylidene chloride, vinyl ethers, acrylic esters, methacrylic esters, acrylic amides, such for example as methacrylic amide, aromatic vinyl compounds, such for example as styrene, iso-olefines, such for example as isobutylene, copolymers based on the aforementioned compounds, such for example as copolymers of vinyl chloride and butyl acrylate vinylidene chloride and butyl acrylate synthetic elastomers, such for example as copolymers of butadiene and styrene, butadiene and acrylonitrile, and also copolymers of dienes with a preponderant proportion of styrene and/or acrylonitrile or other vinyl compounds, as well as polyamides, polyurethanes, polyesters of polycarboxylic acids and polyhydric alcohols, polycarbonates, cellulose ester, rubber and the like are, for example, employed.

*Example 1*

700 g. of a silicone resin as it is obtained by the process disclosed in Example 1 of German patent specification 853,351, 60 percent in toluene, are diluted with 1000 cc. of toluene or alcohol. 1000 g. of zinc oxide, and 0.13 g. of bromophenol blue dissolved in a little alcohol, are then added thereto. This mixture is shaken for a number of hours in a ball mill, whereupon it is poured on to a suitable support, such as metal or paper, and dried. The processing is carried out in the manner usual for electrophotographic processes. The sensitivity of the layer prepared in this way is in the visible range of the spectrum.

*Example 2*

1000 g. of zinc oxide are mixed to a paste with alcohol. 0.2 g. of bromocresol green are added thereto and the mixture is stirred until it is completely homogeneous. The alcohol is then filtered off with suction and the substance is washed until the washing water is colorless. The zinc oxide reacted in this way can be further processed, for example, as indicated below, for the production of a photo-conducting layer, either in this moist state or after first drying it.

200 g. of a reaction product of 3 mols of phthalic acid anhydride, 3 mols of trimethylol propane, 1 mol of pentaerythritol and 5 mols of cyclohexylisocyanate (compare Belgian patent specification 568,418) are dissolved in 1000 cc. of alcohol. 600 g. of the zinc oxide reacted with bromocresol-green are incorporated into this resin solution while stirring and this mixture is then treated for a number of hours in a ball mill. It is then cast on to a suitable support and processed in the usual way. The spectral sensitivity of this layer is well within the visible range.

*Example 3*

300 g. of the reaction product obtained according to Belgian patent specification 568,418 by esterification of 2 mols of phthalic acid anhydride, 1 mol of adipic acid, 4 mols of trimethylolpropane and subsequent reaction of the esterification product with 4.8 mols of cyclohexylisocyanate, are dissolved in 1000 g. of ethanol. 670 g. of zinc oxide and 0.09 g. of chlorophenol-red dissolved in a little ethanol are incorporated into the aforementioned resin solution. This mixture is then treated for some hours in a ball mill and then cast onto a paper support and dried. The processing is carried through in the usual way.

*Example 4*

A 60 percent solution in toluene of 840 g. of a silicone resin as it is obtained by the process disclosed in Example 1 of German patent specification 853,351 is diluted with 500 cc. of toluene. Into this solution there are incorporated 800 g. of zinc oxide and 0.1 g. of bromocresol purple which latter is dissolved in a little ethanol. This mixture is shaken for some hours on a ball mill, whereupon it is coated onto a paper support and dried. The processing is carried out in the manner used for electrophotographic processes.

The increase of sensitivity obtained by the dyestuffs of the present invention is illustrated by the data given in the following table:

| Dyestuff | Amount of Dyestuff per 100 g. of ZnO, g. | Exposure time in lux . sec. |
|---|---|---|
| Bromophenol blue | 0.013 | 960 20 |
| Bromocresol green | 0.013 | 100 |
| Bromocresol purple | 0.013 | 60 |
| Chlorophenol red | 0.013 | 40 |

In the last column of this table there is given the exposure time in lux · sec. which is necessary to obtain under the same conditions electrophotographic images which have the same density.

What is claimed is:

1. A photoconductive sheet material for electrophotography comprising a photoconductive layer having dispersed in an insulating film-forming resinous binder a photoconductive zinc oxide, the latter being sensitized by a phenol sulfone phthalein having the formula

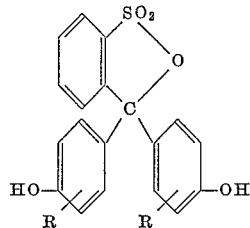

in which formula R represents a substitutent selected from the group consisting of hydrogen, halogen, alkyl, and alkoxy groups.

2. The photoconductive sheet material of claim 1 wherein said phenol sulfone phthalein is selected from the group consisting of bromophenol blue, chlorophenol red, bromocresol purple, and bromocresol green.

3. The photoconductive sheet material of claim 1 wherein the phenol sulfone phthaleins are used in quantities of from 0.001–0.5% based on the photoconductive zinc oxide.

4. A photoconductive material for electrophotography comprising a photoconductive layer having dispersed in an insulating film-forming resinous binder a photoconductive zinc oxide, the latter being sensitized by bromophenol blue.

References Cited by the Examiner

FOREIGN PATENTS 201,416   4/56   Australia.

NORMAN G. TORCHIN, *Primary Examiner.*

MILTON STERMAN, PHILIP E. MANGAN,
*Examiners.*